United States Patent [19]
Hiss

[11] 3,795,086
[45] Mar. 5, 1974

[54] APPARATUS FOR WRAPPING MEAT

[75] Inventor: Reinhard Calhoun Hiss, Crystal Lake, Ill.

[73] Assignee: Borden, Inc., Columbus, Ohio

[22] Filed: Aug. 30, 1972

[21] Appl. No.: 284,900

Related U.S. Application Data
[63] Continuation of Ser. No. 77,064, Oct. 1, 1970, abandoned.

[52] U.S. Cl. .................................... 53/390, 53/211
[51] Int. Cl. ............................................. B65b 11/04
[58] Field of Search ..... 53/3, 32, 33, 211, 214, 390; 99/174; 100/15, 27; 156/184-189, 193, 466, 447, 458; 426/129, 392, 410

[56] References Cited
UNITED STATES PATENTS

| | | | |
|---|---|---|---|
| 3,514,920 | 6/1970 | Hoffler et al. | 53/214 X |
| 2,713,001 | 7/1955 | Manning | 99/174 X |
| 2,993,346 | 7/1961 | Mills | 99/174 X |
| 3,298,265 | 1/1967 | Millican et al. | 53/390 X |

Primary Examiner—Travis S. McGehee
Assistant Examiner—John Sipos
Attorney, Agent, or Firm—George P. Maskas; Donavon L. Favre; George A. Kap

[57] ABSTRACT

A method for wrapping meat, particularly freshly slaughtered carcass, comprises supporting the carcass upon a rotatable member adjacent a roll supply of a plastic film, engaging a portion of the film on the carcass and rotating the support for the carcass so as to cause the film to wrap around the carcass. The apparatus for the method includes an overhead trolley or rail having a supporting hook which permits the carcass to be moved into association with a supporting bracket which mounts a roll supply of a plastic film for rotation about a substantially vertical axis. The carcass is positioned directly adjacent the roll supply of the film and it is a simple manner to peel off a forward portion of the film and engage it on the carcass and then to rotate the carcass to remove a sufficient quantity of the film from the roll supply to completely wrap the carcass. Associated with the reel supply is a cutting knife or heating wire for severing the plastic after a sufficient quantity has been fed. The plastic advantageously comprises a vinyl chloride polymer of a type which possesses a high oxygen permeability rate and which allows the cut surface of the wrapped carcass to maintain its bloom and also a moisture vapor transmission rate which is sufficiently low to prevent dehydration or moisture loss.

1 Claim, 6 Drawing Figures

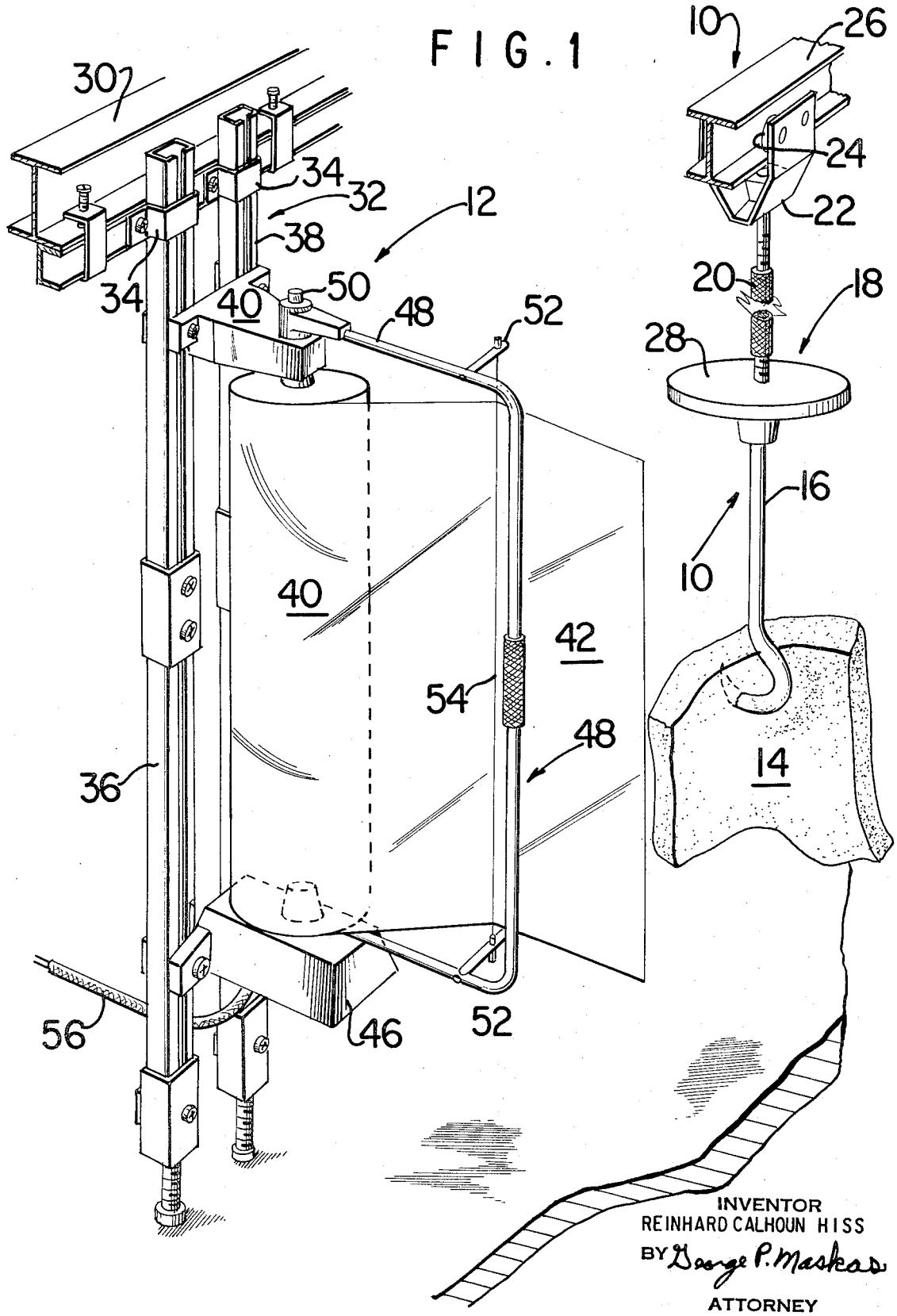

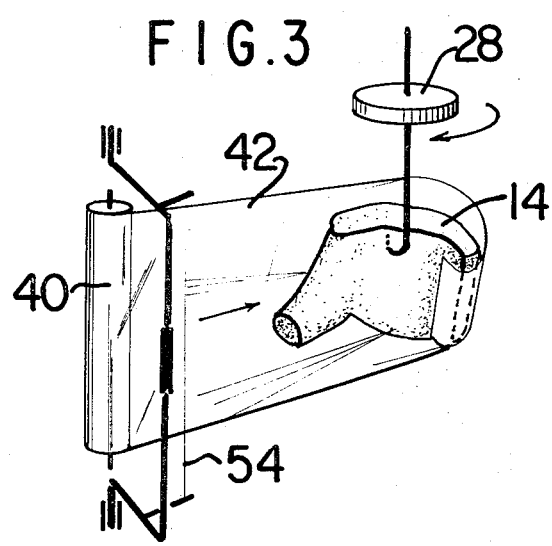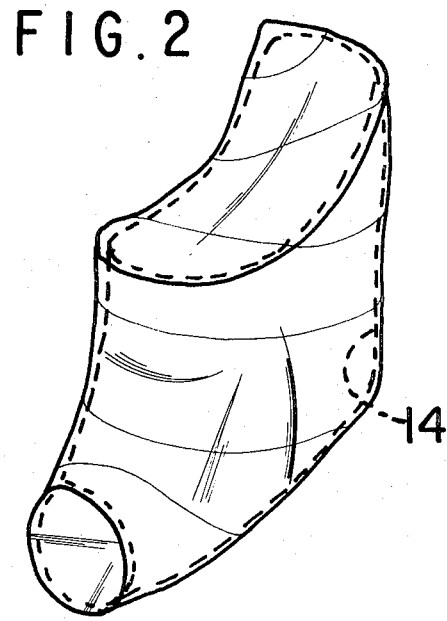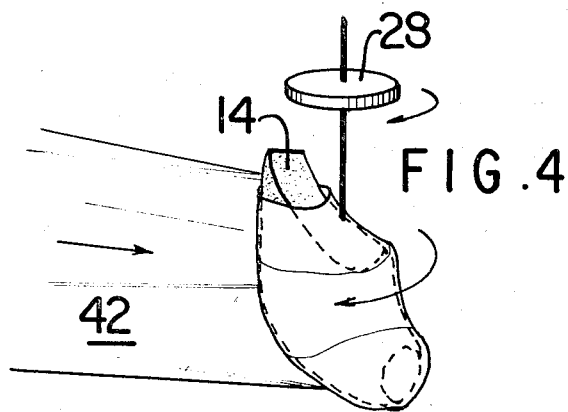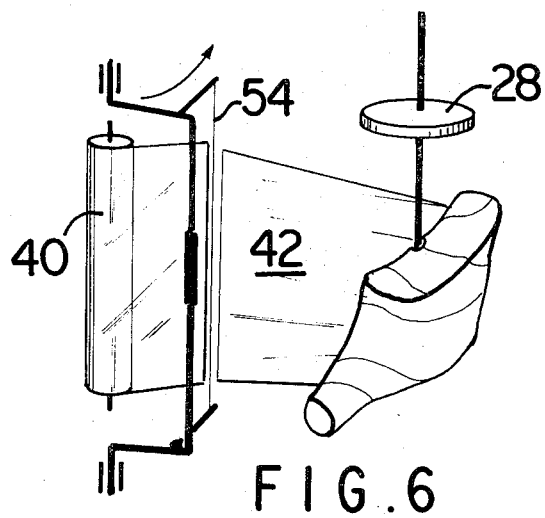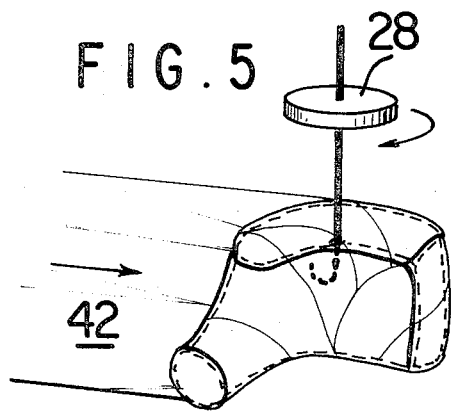

3,795,086

APPARATUS FOR WRAPPING MEAT

This is a continuation of application Ser. No. 77,064 filed Oct. 1, 1970 now abandoned.

SUMMARY OF THE INVENTION

This invention relates in general to an apparatus and method for wrapping meats, and in particular, to a new and useful method for wrapping carcass for quartered portions thereof and to a device which comprises means for supporting the carcass adjacent a dispensing bracket upon which is mounted a rotatable reel supply of plastic film; the rotatable support for the carcass permitting the carcass to be oriented directly alongside the edges of the film and engaged therewith and then alongside the edges of the film and engaged therewith and then rotated to withdraw the film from the reel supply.

At the present time, freshly slaughtered carcass is wrapped and pinned with muslin to firm the fat. The wrapped carcass is dipped in brine while still body hot and thereafter is chilled for up to 48 hours. In the newer procedures, 12 hours has been found sufficient to achieve the necessary heat exchange and the firming up of the meat. When the chilled carcass is pulled out of the cooler, the muslin is removed to be washed, laundered, and reused. The carcass is then quartered. At the present time, the quarters are covered with bags for sanitary purposes, mainly to keep off insects and these bags may be of a crinkled raft paper or they may be polyethylene bags. The use of paper bags has the disadvantage that they permit free access of air to the meat and allow evaporation of water resulting in shrinkage and weight loss of the carcass. Also, the exposed cut surface of the carcass becomes dark in color requiring costly trimming before the meat is sold. Polyethylene bags have the disadvantage that polyethylene does not breath. As the package goes through temperature cycling, evaporated moisture builds up on the carcass causing a condition which approaches slime and which is known in the trade as "smothering the meat." This conditioning again entails weight losses and waste because it requires additional trimming of the carcass.

In accordance with the invention, it has been found that certain types of polyvinyl chloride film are available, particularly a type referred to as a RESINITE film which possess a high oxygen permeability rate which allows the cut surface of the wrapped carcass to maintain its bloom and also to maintain a moisture vapor transmission rate which is sufficiently low to prevent dehydration or moisture loss. In accordance with the invention, the carcass is wrapped entirely with a continuous sheet of this film simply by mounting the carcass on a rotatable support alongside a reel or roll-supply of the film and thereafter engaging the film with the carcass and rotating the carcass to cause the film to feed off its roll and to wrap completely around the carcass. By this simple expedient the visible surface of the meat covered by the film will remain bright red and the fat will remain extremely white. By arranging the carcass so that it is suspended for example, on an overhead trolley on a carrying hook which has a rotatable part and by locating a reel supply of the plastic wrap material directly adjacent the trolley so as to orient the reel for rotation around a vertical axis, it is a simple matter to provide a complete and simple wrapping of the whole carcass or any portion thereof. Prior to the present arrangement, it was impossible to effectively wrap the meat with the polyvinyl chloride films inasmuch as their otherwise desirable properties of softness, limpness, and tackiness interfere with the proper handling of the means and the film to effect a suitable wrapping apparatus. The new wrapping apparatus and method provides a simple means for utilizing the advantages of the polyvinyl chloride films to effectively wrap the carcass material to provide an improved meat handling technique.

Accordingly, it is an object of the present invention to provide a carcass film wrapping device which comprises means for suspending a carcass on a support in a manner permitting it to be rotated, and means for supporting a reel supply of a plastic film directly adjacent the location of the carcass and in a position permitting engagement of the forward edge of the film with the carcass and rotation of the carcass to withdraw the remaining film from the reel supply to effect complete wrapping of the carcass.

A further object of the invention is to provide a meat wrapping station construction which includes a mounting bracket for a reel supply of film for rotatably supporting a vertically elongated roll of plastic film, a movable arm cutting member carried on said bracket adapted to be moved through an arc around the reel supply, and a mounting member adapted to move along a trolley including a rotatable part for suspending a carcass with its longitudinal axis parallel to the axis of the reel supply for positioning the carcass directly adjacent the reel supply so that the forward edge of the sheets thereof may be engaged with the carcass for wrapping purposes.

A further object of the invention is to provide an improved method of wrapping freshly slaughtered carcass which comprises supporting the carcass on a rotatable member directly adjacent a reel supply of a plastic film, engaging the forward edge of the film with the carcass and rotating the carcass to withdraw the film from the reel supply.

A further object of the invention is to provide an improved wrapping technique which comprises wrapping carcasses with a polyvinyl chloride material having improved breathing and moisture retention characteristics and which is characterized by limpness and tackiness as well as softness and which has a great tendency to be engaged with a meat carcass by contact and wherein a carcass is held in a manner adjacent a reel supply thereof so that it may be rotated to become completely encompassed by the plastic material after it is initially contacted thereby.

A further object of the invention is to provide a wrapping apparatus for meat carcass which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a partial front perspective view of a wrapping apparatus for wrapping meat carcass constructed in accordance with the invention;

FIG. 2 is a perspective view of a quartered carcass fully wrapped with an improved polyvinyl chloride packaging film; and FIGS. 3, 4, 5, and 6 are perspective views indicating the manner in which the carcass is wrapped in accordance with the invention.

GENERAL DESCRIPTION OF THE PREFERRED EMBODIMENT

Referring to the drawings, in particular, the invention embodied therein in FIG. 1, comprises an apparatus for wrapping either a complete carcass or a portion thereof and it comprises generally a carcass supporting and positioning device generally designated 10 and a plastic wrap dispenser generally designated 12. A carcass or portion thereof 14 is engaged over a supporting hook 16 of a rotatable holder generally designated 18. The holder 18 is rotatably mounted on a rotation element 20 which is suspended on a bracket 22 having rollers 24 which move over a trackway 26. The rotatable part 18 includes a disk element or handle part 28 which may be engaged by the hands of an operator in order to rotate the disk element with the lower hook part 16 below the rotatable element 20.

In accordance with the method of the invention when a carcass 14 is to be wrapped, it is moved along the trackway 26 to position it directly alongside the plastic wrap dispensing apparatus 12. The dispensing apparatus in the embodiment shown comprises a supporting beam 30 which is located at a wrapping station and which supports a bracket assembly generally designated 32 comprising an attachment part 34 for two vertically extending bracket elements 36 and 38. Mounting means are provided for rotatably supporting a reel supply or roll 40 of a plastic wrapping material 42 for rotation about a vertical or longitudinal axis and include vertically spaced rotation-bearing pedestals 44 and 46 which rotatably support the roll 40. The pedestals also support a movable arm member of generally U-shaped configuration generally designated 48 which is pivoted on an axis 50 of the upper pedestal 44. The arm member carries an extension element 52 which supports a hot wire cutting knife 54 which is supplied with electrical heat energy through an electrical cable 56.

After the carcass is located directly alongside the dispensing apparatus 12 at the wrapping station, the forward edge of the wrapping plastic material 42 is pressed against the carcass to engage therewith. The flat plate 28 is then engaged by the hand of an operator to rotate the carcass and to cause a withdrawing of the film by the pulling action of the carcass on the film to completely wrap the film around the carcass as indicated progressively in FIGS. 3 to 5. After the meat is completely wrapped, the plastic 14 is severed by shifting the arm in the direction of the arrow indicated in FIG. 6 to cause the hot wire knife 54 to move through the plane of the plastic material 42 and to sever it. A feature of the present invention is the apparatus which makes it possible to handle the sheet of polyvinyl chloride film or plastic 42 so that the meat may be wrapped with this improved material without encountering any wrapping details which would normally be expected with a material having the limp characteristics of this material. A material which is particularly suited for this purpose is a RESINITE film which is manufactured by and is a registered trademark of Borden Chemical Company, division of Borden Inc. A film of this nature can reduce the costly weight shrinkage loss by 75 percent or more. This savings alone pays many times over the cost of film and the labor to apply it. The film has a high oxygen permeability rate which allows the cut surface of the wrapped carcass to maintain its bloom and its moisture vapor transmission rate is sufficiently low to prevent dehydration or moisture loss. The exposed surface remains bright red and the fact remains extremely white. The exposed cut surface of an unwrapped carcass tends to become dark in color requiring costly trimming before it is sold. The improved material has excellent low temperature cling properties and it will remain intact and resist puncture during transit to ensure cleanliness in quality of carcass. The material requires no heat for sealing and its built-in cling characteristics keeps it close to the carcass surface. It is specifically acceptable for use in areas where low temperatures and high humidity are required and if it is desired to store or freeze the carcass for any length of time the material of the plastic film will not shatter under any normal freezing temperatures. Because of its low cost it is also a single service item.

The dispenser 12 provides a unique and simple method of applying the film to hinds, fronts, chucks, etc. while they remain hanging in a vertical position on a hook 16. The film is pulled from the dispenser and clings to the carcass hanging on the hook. Rotation of the carcass creates a spiral effect and covering. After hot wire 54 cuts the film, the ends are tucked underneath the carcass to ensure maximum protection. An example of the nature of the components of such material is set forth in U.S. Pat. No. 3,479,308.

What is claimed is:

1. A device for wrapping a carcass suspended from a meat carcass holder, wherein the meat carcass holder includes a hook for engagement with the meat carcass, which hook is rotatable relative to a fixed part, said fixed part including a bracket having a wheeled portion, which is movable along a trackway running to and away from the carcass wrapping device, said meat carcass while suspended on said hook being orientable alongside the ends of a plastic film for initial engagement therewith and being rotatable to draw the plastic film from a reel supply, wherein the improvement comprises a mounting bracket for rotatably supporting a reel of plastic film, a reel of plastic film vertically supported in said mounting means and having an end of said film extending laterally, knife means comprising a rotatable U-shaped arm having a central handle portion which extends substantially axially in respect to said axis of said reel supply, and a knife member carried by said arm and extending substantially parallel to the axis of said reel supply and being movable by said arm across the path of the plastic film which is fed from said reel supply to the meat carcass suspended from the meat carcass holder.

* * * * *

UNITED STATES PATENT OFFICE
CERTIFICATE OF CORRECTION

Patent No. 3,795,086     Dated March 5, 1974

Inventor(s) Reinhard Calhoun Hiss

It is certified that error appears in the above-identified patent and that said Letters Patent are hereby corrected as shown below:

Col. 1 line 47 add "®" after the word RESINITE

Col. 2 line 5 -- means -- should be "meats"

Signed and sealed this 30th day of July 1974.

(SEAL)
Attest:

McCOY M. GIBSON, JR.
Attesting Officer

C. MARSHALL DANN
Commissioner of Patents